May 12, 1959 — W. M. WINSLOW — 2,886,151
FIELD RESPONSIVE FLUID COUPLINGS
Filed Jan. 7, 1949 — 3 Sheets-Sheet 1

INVENTOR
WILLIS M. WINSLOW
ATTORNEYS.

May 12, 1959   W. M. WINSLOW   2,886,151
FIELD RESPONSIVE FLUID COUPLINGS
Filed Jan. 7, 1949   3 Sheets-Sheet 2

INVENTOR:
WILLIS M. WINSLOW
BY Bruninga and Sutherland
ATTORNEYS.

May 12, 1959

W. M. WINSLOW 2,886,151

FIELD RESPONSIVE FLUID COUPLINGS

Filed Jan. 7, 1949

INVENTOR:
WILLIS M. WINSLOW
BY Bruinga and Sutherlart
ATTORNEYS.

United States Patent Office 2,886,151
Patented May 12, 1959

2,886,151

FIELD RESPONSIVE FLUID COUPLINGS

Willis M. Winslow, Wheatridge, Colo., assignor to Wefco Inc., Denver, Colo., a corporation of Colorado Application January 7, 1949, Serial No. 69,646

4 Claims. (Cl. 192—21.5)

The present invention relates to force transmitting apparatus involving a field responsive fluid coupling. More specifically, it relates to fluid clutches, brakes, and the like, wherein one member exerts force on another member by reason of a field-induced fibration in an intervening fluid film.

Fluids suitable for the practice of the present invention may be responsive to either an electric or magnetic field. In either case, it is found for best results that the fluids should be composed of solid particles in high concentration suspended in a suitable oily vehicle of relatively low viscosity. Fluids suitable for response to an electric field are of such nature that the solid particles therein have high ability to take on electrical charges of opposing polarity or of high electrical conductivity or dielectric constant. Suitable magnetically responsive fluids are of such nature that the particles are highly susceptible to magnetization or of high permeability or capable of sustaining opposing magnetic poles.

When properly formulated fluids of the foregoing type are subjected to an applied field, a slight migration of the particles tends to occur. The particles seek regions of high field intensity and in so doing tend to associate with other particles in the form of chains or fibres. This migration to form a fibrous mass is aided by forces which move the particles mechanically as when the fluid is subjected to shear.

In dilute mixes the formation of these fibres in the direction of the field is readily observed under the microscope. In high concentration the individual fibres are not discernible. Nevertheless, it is possible to show their existence in terms of a definite tensile strength in the direction of the applied field.

In general, in order to achieve an enhanced force transmitting effect, it has been found that the volume concentration of electrically- or magnetically-chargeable particles should exceed about 38%. This fact appears best explained as due to a secondary interaction or jamming of the fibres. Such fluids are capable of induced shear stresses higher than 1 lb./in.$^2$.

In using these field responsive fluids for various applications, certain practical difficulties have been encountered, particularly in applications involving transmission of large values of mechanical power. In general, it is found that if, under the action of shear, the fluid film be of sufficiently low viscosity to allow easy slippage when slippage is desired, i.e., with little or no applied field, then the particles may be partially separated from the oil vehicle by centrifugal action, resulting in an oil slip layer which may persist when slippage is not desired, i.e., with high applied field.

A further difficulty analogous to the one just mentioned is a gravitational settling of the particles during idle periods of the coupling and which may result in binding of the rotor members.

It is also found that the stable life of the fluid film is not unlimited. Under conditions of hard use and heat, mechanical decomposition of molecules may occur, as also alteration in the particle surfaces, resulting in material alteration of the characteristics of the coupling.

In addition, particularly under conditions of hard usage, gases are sometimes evolved in the fluid film. The accumulation of these gases in the form of bubbles also alters the characteristics of the coupling.

The general object of this invention is to provide a fluid coupling so constructed, and charged with such a field responsive fluid, that the foregoing difficulties are largely overcome.

Thus, the main object of this invention is the provision of a field responsive fluid coupling which will transmit smooth and constant torque, depending on applied field, for long periods of time, either continuously or intermittently, as needs may dictate, without the necessity for frequent recharging of the fluid therein.

Another object of the invention is to provide a field responsive force transmitting apparatus so designed and constructed as to prevent or reduce to a minimum the aforesaid failures of the flux field responsive fluid film therein.

Further objects of the invention include the provision of field responsive force transmitting equipment of simple and inexpensive design, reliable in operation, and otherwise well suited to various uses.

Still further objects will become apparent as the present description proceeds.

Referring to the drawings.

Figure 1:
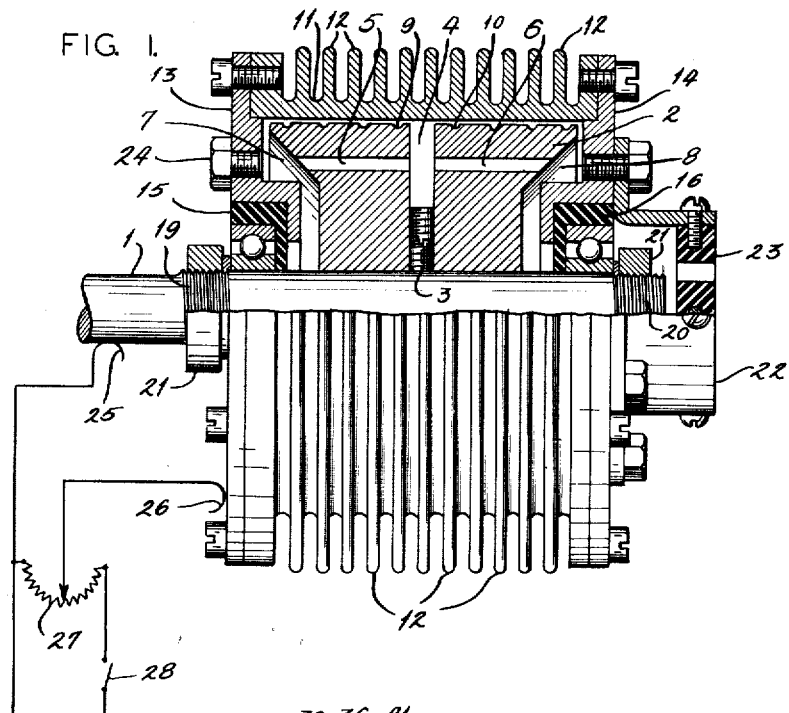
Figure 1 is an elevation, partially in section, of an electric-field responsive coupling involving the principles of the present invention.

With reference to the electric field coupling of Figure 1, I provide a shaft 1, which has an inner cylindrical metal rotor 2 suitably affixed thereto, as by means of a set screw 3. The inner rotor 2 has a medial annular groove 4 in communication with a plurality of circumferentially spaced passages 5 and 6 extending axially to the inwardly dished ends 7 and 8 of the rotor. The peripheral surface of the inner motor is formed with recesses, the various functions of which will appear hereinafter. In the embodiment shown, these recesses have the form of helical grooves 9 and 10, oppositely pitched, and extending the full length of the rotor.

An outer cylindrical metal rotor coaxially surrounds the inner rotor and comprises a shell 11 having outer cooling fins 12 and an inner surface closely spaced in general parallelism to the periphery of the inner rotor 2. Removably fastened to the ends of the shell 11 are annular end plates 13 and 14. The central portions of these are offset to provide annular shoulders, into which are pressed annular insulating rings 15 and 16. Pressed into rings 15 and 16 are suitable ball bearing units received on the shaft 1.

The shaft 1 is preferably threaded at 19 and 20 to receive adjustable locking nuts 21 which serve to prevent end play of the inner rotor and to position the same for proper clearance relative to the end plates 13 and 14.

Fastened to end plate 14 of the outer rotor is a cup member 22 having an insulating plate portion 23 adapted to be engaged by a driving motor or other source of shaft power, not shown. The other end plate 13 has a filling plug 24 which, on removal, permits the charging of the coupling with an electric field responsive fluid.

Brushes are indicated at 25 and 26, by which electrical potential may be applied across the fluid film during relative rotation of the inner and outer rotors. The brushes are connected to a variable resistance 27 connected to serve as a voltage regulator responsive to torque demand or to any other condition for which it is desired to control transmission of torque by the coupling. The circuit also includes a starting switch 28 connecting with a source of voltage. Either A.C. or D.C. supply may be used.

It will be understood that the coupling of Figure 1 may, if desired, be enclosed in an outer housing, through which a cooling medium is circulated, and suitable mounting arrangements may be used. These features are common and well known in couplings of the eddy current magnetic drive type and form no part of the present invention.

The operation of the clutch shown in Figure 1 will now be described. Although useful as a brake and for other purposes, it will be assumed for purposes of illustration that shaft 1 is connected to an appropriate load and that cup 22 is driven by a suitable rotor. On starting, the switch 28 may be left open to permit the motor to quickly reach rated speed. On closure of switch 28, the coupling is potentialized in accordance with torque demand as determined by the setting of the regulator 27. Torque is now transmitted to the shaft 1 and the load is driven, the transmitted torque and hence the load speed depending on the applied voltage. If voltage is less than a critical value, the fluid film will allow relative slippage between the inner and outer rotor surfaces. This slippage occurs smoothly due to the inherent properties of the fluid film. The heat which is produced, and which is proportional to the slip speed times the torque, is dissipated through the shell 11 to the fins 12 and thence to the surrounding medium.

During slippage, the oppositely pitched grooves 9 and 10 circulate the fluid film axially in opposite directions toward (or away from, depending upon the direction of rotation), the end spaces or reservoirs at the dished ends 7 and 8 of the coupling, thence in the reverse axial direction via the passages 5 and 6, thence radially outwardly (or inwardly) in the radial groove or reservoir 4. If desired, these directions may be reversed by reversing the pitch of the grooves. In either case, the net effect is a recirculation of the fluid to and from the working film space and conveyance of gas bubbles therefrom to the end spaces where they can be centrifuged inwardly and suitably vented through or adjacent the bearings 17 and 18. The action described utilizes the relatively large amount of fluid in spaces at 7 and 8, in passages 5 and 6, and in groove 4, with consequent increase in the life of the fluid charge. Other beneficial results will be described hereinafter.

Figure 2:
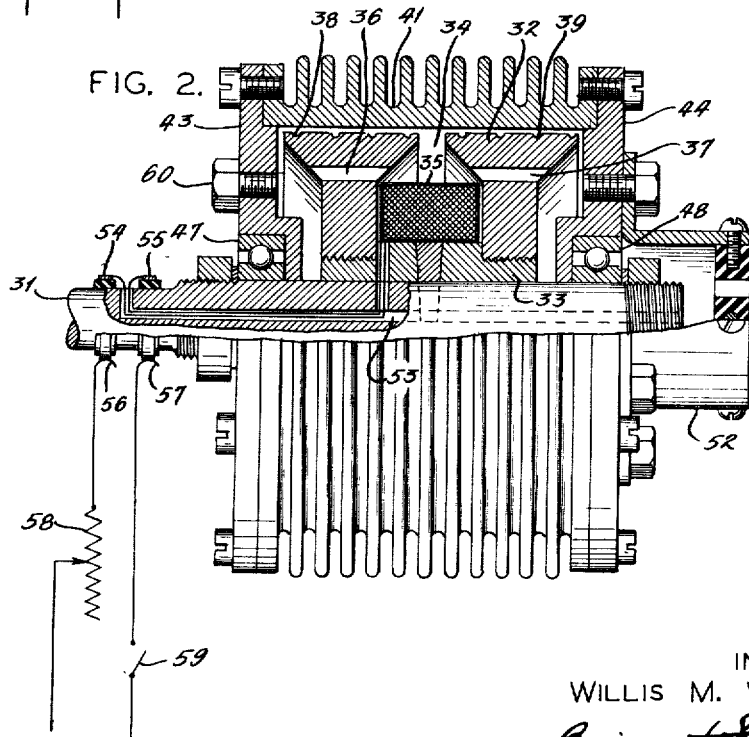
Figure 2 is a modification of Figure 1, adapting the same for use of a magnetic field responsive fluid.

Referring now to Figure 2, the coupling therein shown is similar to Figure 1, but modified to utilize a magnetic field responsive fluid. In this form, a shaft 31 has keyed thereto an inner rotor 32 formed of dished annular pole members threaded on the ends of a hub member 33. Between the pole members is formed an annular cavity 34, the inner portion of which is wound with a current coil 35. The outer portion of cavity 34 communicates with a circumferential series of axial passages 36 and 37 which extend to the spaces or reservoirs formed at the outer ends of the inner rotor, as shown.

The periphery of the pole pieces is cylindrical and preferably recessed by oppositely pitched grooves 38 and 39 in the same manner as Figure 1. The rotor 32, including the annular pole pieces and the hub member 33, are of suitable magnetic steel.

The outer cylindrical rotor of Figure 2, including shell 41 and end plates 43 and 44, is the same in form as those shown in Figure 1. In this case, the shell 41 is made of magnetic steel, but end plates 43 and 44 are preferably of non-magnetic material, such as brass or bronze. Bearings 47 and 48 are set directly into the end plates 43 and 44. The cup member 52 need not be provided with the insulating plate portion of Figure 1, but is otherwise similar.

The coil 35 has insulated leads which pass through a passage 53 in shaft 31 and connect with insulated slip rings 54, 55. Brushes 56, 57 contact the slip rings and are connected in circuit with the torque demand control rheostat 58 and a suitable switch 59. The construction also includes a filling plug 60 and is similar to Figure 1 in details for centering the rotor.

In the operation of the coupling of Figure 2, the magnetic field produced by the coil 35 passes across the peripheral space between pole pieces 32 and shell 41, and induces fibration of the particles in the magnetic field responsive medium with which said peripheral space is charged. The intensity of this field is regulated by the current as controlled by the rheostat 58. Analogous to Figure 1, no slippage occurs when the field strength exceeds a critical value for a given load.

If alternating current is applied to coil 35, the rotor 32 and shell 41 may be suitably laminated in accordance with the practice in the art to prevent excess heating from induced electric currents.

In both Figure 1 and Figure 2, the induced torque is found to vary as the square of the field strength in accordance with the relation $$T+T_0=k(F-f)^2$$

where T is the induced torque, $k$ a proportionality factor, F the applied field, $f$ a field associated with the electrical double layer of the particles. The field $f$ may be either negative or positive depending on the ingredients which form the surface of the particles, and $T_0$ a component of torque associated with the factor $f$. It is also found that induced torque for given applied field is almost independent of the slip speed over relatively wide limits.

Figure 3:
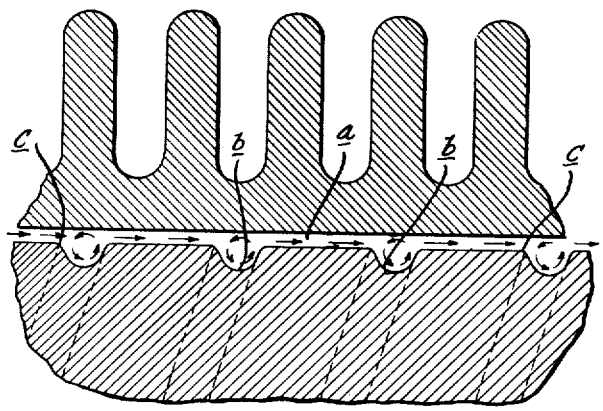
Figure 3 is an enlarged fragmentary view of the film region of Figures 1 and 2.

Further details of the operation will be better understood by reference to Figure 3, which represents a longitudinal fragmentary section through the fluid film and adjoining rotor members of either Figure 1 or Figure 2.

In Figure 3, I have indicated the film of field responsive medium at $a$, the grooves at $b$, and the edges of the grooves at $c$. The radius of curvature of the edges $c$ is made of the order of $\frac{1}{10}$ that of the grooves which, as shown, are preferably of semi-circular cross section. In the presence of an applied field, either electric or magnetic, an intensification of the field occurs at the edges $c$. Accordingly, the fibration is more intense in those portions of the fluid film immediately adjacent the edges $c$. Hence, as the helical grooves rotate, a lengthwise sweeping action of the film occurs. This action tends to build up a lengthwise pressure gradient and to simulate the operation of a viscosity pump even though large clearances are used, the back flow tendency being impeded by the strongly congealed fluid which tends to form a seal at the edges $c$.

Accompanying the aforesaid sweeping action is an overturning of the fluid within the grooves, as indicated by the curved arrows of Figure 3. This action may be likened to a road grader in tending to roll the material in front of the blade. The overturning of fluid serves to remix such particles and oil as have become separated by centrifugal effect during operation of the coupling.

Summarizing the operation, the grooves produce an over-all sweeping action, which is in opposite directions to balance the end thrusts on the rotor, and a local overturning to preclude separation of the particles and oil between the working surfaces. The over-all circulation, involving the reservoir spaces, serves to lengthen the life of the charge of fluid and to eliminate generated gases.

In order to preclude a gravity settling of particles when the coupling is idle for long periods, the fluid is compounded to have a definite thixotropy sufficient to hold the particles immobile under kinetic agitation of molecules, but to allow for Brownian movement of the particles in the presence of mechanical shear. This thixotropic nature of the fluid also precludes to some extent centrifuging of particles when the coupling is operated at zero slip speed although, under this circumstance, centrifuging is mainly precluded by the intense fibration present.

Suitable dimensions which have been found for the spacing at $a$ range from .002" for couplings used for very low slip speeds to .06" for couplings used for very high slip speeds. The grooves may occupy from one-half to one-tenth of the rotor surface area and their depth may range from two to ten times the spacing at $a$.

The couplings will also circulate fluid in the manner described if the grooves are transferred from the inner rotor surface to the inner surface of the outer rotor shell.

Figure 4:
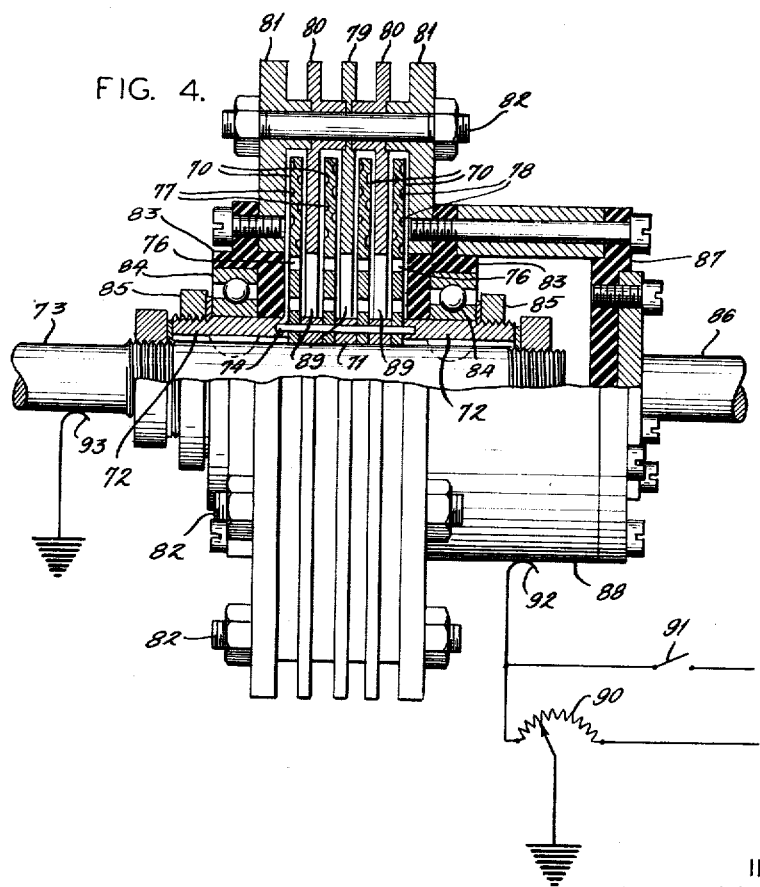
Figure 4 is an elevation, partially in section, of a further modification.

A further embodiment of the invention is illustrated in Figure 4 wherein the principles are applied to a multi-disc type coupling charged with an electric field responsive fluid. In this form, a plurality of annular plates 70 with spacers 71 are clamped between hub members 72, which are in turn keyed to a shaft 73. Pins, such as shown at 74, pass through the annular plates and into recesses in the hub members 72. The hub members are clamped by nuts 75 threaded on the shaft 73.

Each annular plate 70 is provided with an annular series of recirculation ports 76. Outwardly of ports 76 and on the faces of each plate are provided oppositely pitched spiral grooves 77, 78, the cross-sectional form of which is the same as in the previously described forms.

Facing the plates 70 and in closely spaced relation thereto is a second series of annular plates 79, 80, 81, certain of which have annular spacing shoulders or grooves, through which pass a series of tie bolts 82. Bolted to the end plates 81 are a pair of laminated fibre insulating members 83, into which ball bearing units 84 are inserted, the latter being clamped to the members 83 by nuts 85 on the hub members 72.

The outer peripheral portions of the plates 79, 80, 81 serve as heat-dissipating fins for the coupling.

The coupling may be driven by a shaft 86 attached to an insulating plate 87, which is fastened to a ring 88, an insulating member 83, and an end plate 81, by means of bolts.

The radial width of the annular plates 79, 80 is chosen such that inner reservoir spaces 89 are provided in fluid communication with the ports 76.

Potential is applied to the coupling of Figure 4 through a switch 91, a potentiometer 90 which is responsive to torque demand, and the brushes 92, 93. This establishes an electric field between the annular plates with resultant torque transmission, as already described.

During slippage of the coupling of Figure 4, a circulation of the fluid film occurs radially outward on one side of a plate 70 and radially inward on the other side thereof, thence transversely through a port 76. This circulation brings the fluid into continual exchange with fluid in the reservoir spaces 89 and into which evolved gases may collect and escape adjacent the bearings of the coupling.

Figure 5:
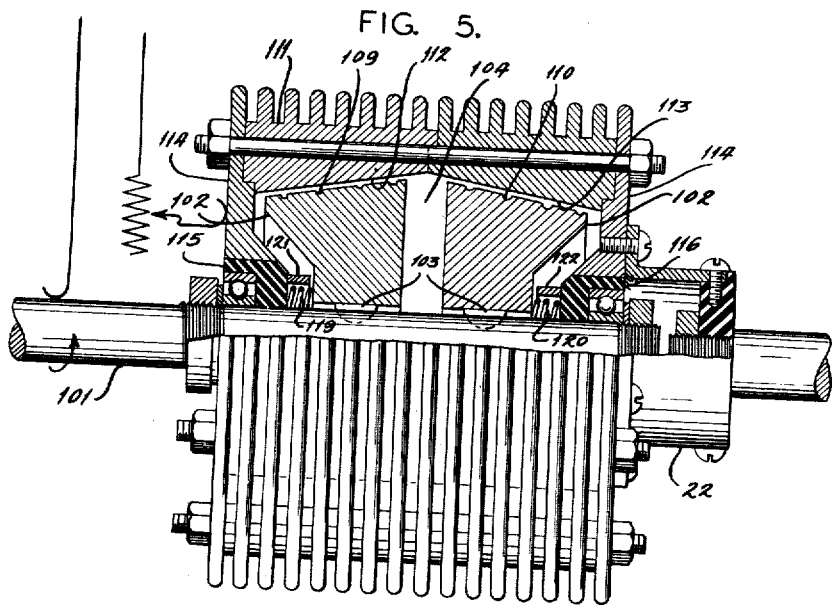
Figure 5 is an elevational view, partly shown in section, of another embodiment wherein the clutch is responsive to an electric flux field.

Referring now to Figure 5, a modified form of the clutch is shown wherein the space between the relatively movable members is varied in accordance with the demand upon the clutch so as to provide a high or low ratio of torque transmission. In this embodiment, a driving shaft 101 has mounted upon it two rotor pieces 102. The rotor pieces 102 are secured to the shaft 101 by keys 103 so as to prevent relative rotational movement between the parts, but the rotor parts 102 are free for limited movement axially relative to the shaft 101 and relative to each other. Between the rotor parts 102 is a space 104 extending completely around the assembly. The space 104 is subject to variation in axial dimension, and hence in volume, upon relative movement of the rotor parts 102. The peripheral surfaces of the respective parts 102 are provided with grooves 109 and 110, as in the previous embodiments. An outer shell 111 surrounds the rotor, as in the previous embodiments, but in this instance the interior configuration of the shell 111 consists of two oppositely coned portions 112 and 113, the slope of which parallels the slope of the periphery of the rotor parts 102.

The shell 111 is provided with end members 114, one of which is provided with a cup 22 for connection with the driven shaft, as in Figure 1. The end members 114 are mounted upon suitable bearings and separated from shaft 101 by insulating spacers 115 and 116, as in Figure 1. Interposed between the spacers 115, 116, and the adjacent rotor parts 102 are coil springs 119 and 120, which act to urge the respective rotor parts axially toward each other, but yield to permit said rotor parts to move away from each other under circumstances later to be described. Surrounding the springs 119 and 120 are spacing sleeves 121 and 122 arranged so as to prevent outward movement of either of the rotor parts 102 to such extent that it comes into physical contact with the surfaces 112 and 113 of shell 111.

The grooves 109 and 110 on the exterior periphery of the rotor parts 102 are spiralled so that, when rotation takes place in the direction indicated by the arrow, the flux concentration at the edges of the groove tends to sweep the fluid medium (with which the space between the rotor parts 102 and the shell 111 is charged) toward space 104. As the fluid is continuously swept toward space 104, pressure in the latter builds up to an extent such that the rotor parts 102 are moved axially away from each other and consequently the interspace between their peripheries and the adjacent surfaces 112 and 113 is correspondingly reduced. The spacers 121 and 122, however, prevent the parts from coming into physical contact, as aforesaid. Since for a given potential difference across the space between the rotor parts and the shell, the torque transmission ability of the fluid is an inverse function of the space between the parts 102 and 111, a relatively small axial movement of the parts 102 will suffice to make a great relative change in the interspace resulting in a larger change in the force transmitted by the clutch.

Figure 6:
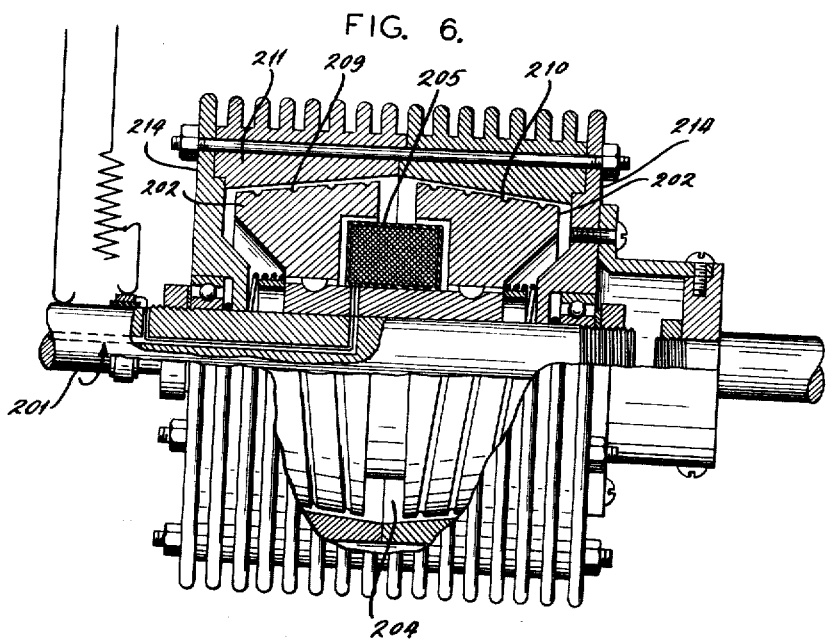
Figures 6 is a view corresponding to Figure 5, but showing the clutch modified to be responsive to a magnetic flux field.

The corresponding magnetically responsive clutch is shown in Figure 6 wherein the shaft 201 has mounted upon it relatively movable pole pieces 202, which, as in the previous embodiment, are arranged for limited axial movement relative to each other and to the shaft 201. A circumferential space 204 is maintained between the parts 202. Additionally, there is an enlargement of the space 204 to accommodate a current coil 205 arranged to be energized by an external source of electric current in a manner corresponding to the showing of Figure 2. The other parts correspond in general arrangement to the showing of Figure 5, the end plates 214 being of non-magnetic material.

Upon the energization of coil 205, a magnetic field is established, which traverses the shaft 201, travels outwardly through one of the pole pieces, across the space between the shell and the pole pieces (which space is charged with magnetically responsive fluid), thence through shell 211, again across the interspace, and back through the other pole piece. As in the previous embodiment, the exterior surfaces of the pole pieces are provided with spiral grooves 209 and 210, which tend to force the fluid toward space 204 upon rotation in the direction indicated by the arrow. As in the previous embodiment, the continued forcing of fluid to the central space 204 forces the pole pieces axially apart and thereby reduces the interspace between the shell 211 and the pole pieces.

Otherwise the parts of the device shown in Figure 6 correspond essentially to the comparable parts of the device shown in Figure 5 or the other figures.

Field responsive fluids

By the term "field responsive fluid," as used in the present disclosure and claims, is meant any fluid of the type composed of a suitable liquid and suspended substantially solid particles which are attractable in the presence of an electric or magnetic field to impart shear resistance to the fluid.

Fluids suitable for the couplings described may be made from a variety of materials. The following formulas and procedures should be considered exemplary rather than limitative of fluids contemplated by the present invention.

For the electric field repsonsive fluids, I add 100 parts by weight of dry micronized silica gel powder of dessicant grade to a solution containing about 40 parts by weight of an electrically stable dielectric oily vehicle of from 2 to 20 centipoise viscosity at 25° C., about 10 parts by weight of an oil soluble dispersing agent, such as sorbitol sesqui-oleate, sold as Arlacel C, ferrous oleate, lead naphthenate, etc., about 10 parts by weight of a water soluble dispersing agent, such as sodium oleate, sodium naphthenate, or polyoxyalkalene derivative of sorbitol oleate, sold as Tween 80, etc., and then about 15 parts by weight of water.

This mix, which is initially in a somewhat pasty condition, is circulated through a pump, such as shown and described in my prior application, Serial No. 716,626, filed December 16, 1946, now abandoned. The pumping is continued until the mix becomes a readily flowing thixotropic syrup. During the latter part of the pumping, the fluid is exposed to drying conditions to remove about half of the original 15 parts of water and to bring the resistivity of the fluid into the range between $10^8$ and $10^{10}$ ohm per cm.

The term "thixotropic" is used in this specification in its usual sense; that is, to mean that the fluid quickly sets to a gel when no longer molested by mechanical forces and just as quickly reverts to a liquid syrup when again subjected to mechanical forces, this phenomenon repeating itself each time the coupling passes through a cycle of slipping and non-slipping.

As an alternative, I may substitute for the 100 parts by weight of silica gel of the above formula about 60 parts by weight of dry micronized synthetic resins of the exchange type as now commonly used in adsorption processes. Ion exchange resins are found to have an adsorption capacity for the foregoing soaps or dispersing agents which is comparable to silica gel. The fluidizing of the resin type mixes may be similarly accomplished by a pumping operation.

For the magnetic field responsive fluids, I may add 100 parts by weight of reduced iron oxide powder sold as "Iron by Hydrogen Merck" to a solution containing 10 parts by weight of a lubricant grade oily liquid of from 2 to 20 centipoises at 25° C., and 2 parts by weight of ferrous oleate or ferrous naphthenate as dispersant. The somewhat pasty mix is pumped, as before, until fluidized. Toward the end of the pumping operation, I prefer to add about 1 part by weight of an alkaline soap, such as lithium stearate or sodium stearate, to impart thixotropic body to the fluid.

In general, the thixotropic body of either the electric or magnetic field responsive fluid may be increased by substituting for part of the oleates or naphthenates a corresponding part of laurate, palmitate, or stearate.

An alternative magnetic field responsive fluid may be made by substituting for the reduced iron oxide an extremely fine grade of iron powder made by retorting iron carbonyl in a manner well known to the art.

The purpose of the prolonged pumping operation in the above procedures is two-fold: Agglomerates of the primary particles are broken up so that the largest particles present are of micron size; and the surfaces of the primary particles are conditioned or smoothed in a manner not fully understood. In this way, the normal viscosity of the fluid is reduced and the field-induced viscosity is increased.

The function of the soaps or soap-like additives in the above formulas is three-fold: (1), they enable very concentrated yet workable fluids, such that on working in a pump the agglomerates are broken up by large shearing stresses; (2), they provide a particle coating with low sliding coefficient of friction; (3), they serve to render the fluid thixotropic with the advantages already described. Other functions of the soaps or dispersing agents involve the electric double layer which determines whether the particles will have repulsion or attraction apart from action of the applied field, and in the case of electric field responsive fluids the dielectric strength of the films on the particles is also involved.

This application is a continuation-in-part of my copending now abandoned application Serial No. 716,626, filed December 16, 1946.

Having thus described the invention, what is claimed and desired to be secured by Letters Patent is:

1. In a coupling of the character described wherein torque is transmitted through a flux field responsive fluid disposed in the space between a pair of coaxial relatively rotatable members which constitute opposite poles of a flux field; said members having their proximate surfaces which define said space parallel with each other but inclined with reference to their axis, one of said relatively rotatable members being movable axially relative to the other to vary said space, means responsive to pressure of the flux field responsive fluid for effecting the axial movement of said movable member.

2. An electro-mechanical coupling device comprising coaxial relatively rotatable members arranged in closely spaced relation to provide opposed surfaces, a field responsive fluid film occupying the space between said surfaces, one of said surfaces having circumferentially elongated recesses occupied by relatively thick portions of said fluid, the side edges of said recesses having a small radius of curvature relative to the width thereof, means establishing a field between said surfaces whereby a relatively high field intensity at said edges is produced, said recesses being in the form of continuous grooves having a convoluted arrangement to propel the fluid in a direction generally parallel to said surfaces, and said convoluted grooves being arranged as a pair of opposite pitch to propel said film in opposite directions.

3. An electro-mechanical coupling comprising coaxial members arranged in closely spaced relation to provide opposed surfaces, a field responsive fluid film occupying the space between said surfaces, means establishing a field between said surfaces, and means for progressively circulating said film in a direction generally parallel to said surfaces and transverse to the direction of rotation of said surfaces, reservoirs in fluid communication with said film, said last means including convoluted grooves on one of said surfaces, said grooves being arranged as a pair of opposite pitch to balance the end thrust of said circulating film.

4. An electro-mechanical coupling comprising coaxial members arranged in closely spaced relation to provide opposed surfaces, a field responsive fluid film occupying the space between said surfaces, means establishing a field between said surfaces, and means for progressively circulating said film in a direction generally parallel to said surfaces and generally transverse to the direction of rotation of said surfaces, said last means including convoluted grooves on one of said surfaces, said grooves being arranged as a pair of opposite pitch.

References Cited in the file of this patent

UNITED STATES PATENTS

| | | |
|---|---|---|
| 811,654 | Murphy | Feb. 6, 1906 |
| 2,106,882 | Betz | Feb. 1, 1938 |
| 2,193,214 | Winther | Mar. 12, 1940 |
| 2,195,902 | Pezzillo | Apr. 2, 1940 |
| 2,214,901 | Griffin | Sept. 17, 1940 |
| 2,299,049 | Ziebolz | Oct. 13, 1942 |
| 2,407,504 | Martin | Sept. 10, 1946 |
| 2,417,850 | Winslow | Mar. 25, 1947 |
| 2,519,449 | Findley | Aug. 22, 1950 |
| 2,525,571 | Winther | Oct. 10, 1950 |
| 2,575,360 | Rabinow | Nov. 20, 1951 |

FOREIGN PATENTS

| | | |
|---|---|---|
| 463,689 | Belgium | Apr. 30, 1946 |
| 920,562 | France | Apr. 11, 1947 |

OTHER REFERENCES

Technical Report 1213, Bureau of Standards Publication, received in Division 68, March 30, 1948, 27 pages.

Business Week, December 18, 1948, pages 48, 49, 50.